United States Patent
Kondo

(10) Patent No.: US 9,487,047 B2
(45) Date of Patent: Nov. 8, 2016

(54) OIL-EXTENDED NATURAL RUBBER AND METHOD FOR PRODUCING THE SAME AND RUBBER COMPOSITION AND TIRE USING THE SAME

(75) Inventor: Hajime Kondo, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 912 days.

(21) Appl. No.: 12/161,699

(22) PCT Filed: Jan. 25, 2007

(86) PCT No.: PCT/JP2007/051177
§ 371 (c)(1),
(2), (4) Date: Jul. 22, 2008

(87) PCT Pub. No.: WO2007/088771
PCT Pub. Date: Aug. 9, 2007

(65) Prior Publication Data
US 2010/0222488 A1    Sep. 2, 2010

(30) Foreign Application Priority Data
Jan. 31, 2006    (JP) .................. 2006-023049

(51) Int. Cl.
| | | |
|---|---|---|
| B60C 1/00 | (2006.01) | |
| C08C 1/14 | (2006.01) | |
| C08C 1/15 | (2006.01) | |
| C08K 3/04 | (2006.01) | |
| C08K 3/36 | (2006.01) | |
| C08K 5/01 | (2006.01) | |
| C08L 7/00 | (2006.01) | |

(52) U.S. Cl.
CPC . *B60C 1/00* (2013.01); *C08C 1/14* (2013.01); *C08C 1/15* (2013.01); *C08K 3/04* (2013.01); *C08K 3/36* (2013.01); *C08K 5/01* (2013.01); *C08L 7/00* (2013.01)

(58) Field of Classification Search
CPC ............ B60C 1/00; C08C 1/14; C08C 1/15; C08K 3/04; C08K 3/36; C08K 5/01; C08L 7/00
USPC ................................. 524/496, 575.5
See application file for complete search history.

(56) References Cited

U.S. PATENT DOCUMENTS

2005/0027060 A1*    2/2005    Yagi et al. .................... 524/493

FOREIGN PATENT DOCUMENTS

| GB | 730 864 A | 6/1955 | |
|---|---|---|---|
| GB | 1 000 588 A | 8/1965 | |
| GB | 1 075 234 A | 7/1967 | |
| JP | 4-089847 A | 3/1992 | |
| JP | 4-89847 A | 3/1992 | |
| JP | 04089848 A * | 3/1992 | ............... C08L 7/00 |
| JP | 2005-120153 A | 5/2005 | |
| JP | 2005-162810 A | 6/2005 | |
| JP | 2007-51206 A | 3/2007 | |
| JP | 2007-051206 A | 3/2007 | |

OTHER PUBLICATIONS

Japanese Office Action issued on Nov. 20, 2012 in Japanese Application No. 2007-556828.
Malaysian Office Action issued on Feb. 14, 2014 from the Malaysian Patent Office in Malaysian Application No. PI 20082788.

* cited by examiner

*Primary Examiner* — Angela C Scott
(74) *Attorney, Agent, or Firm* — Sughrue Mion, PLLC

(57) ABSTRACT

This invention relates to an oil-extended natural rubber capable of improving a tensile strength and a wear resistance of a rubber composition, and more particularly to an oil-extended natural rubber formed by adding an emulsified extension oil to a natural rubber latex and further coagulating and drying them. An amount of the extension oil added is preferable to be within a range of 5-80% by mass based on a rubber component in the natural rubber latex and the oil-extended natural rubber is preferable to have a weight average molecular weight as converted to polystyrene of a rubber component of not less than 1,500,000.

8 Claims, No Drawings

OIL-EXTENDED NATURAL RUBBER AND METHOD FOR PRODUCING THE SAME AND RUBBER COMPOSITION AND TIRE USING THE SAME

TECHNICAL FIELD

This invention relates to an oil-extended natural rubber and a method for producing the same as well as a rubber composition and a tire using the same, and more particularly to an oil-extended natural rubber having a good processability though a molecular weight of a rubber component is high and capable of improving a tensile strength and a wear resistance of a rubber composition.

BACKGROUND ART

Recently, it is demanded in a market to further extend a service life of a tire by improving a durability thereof. Natural rubber is generally superior to a synthetic rubber in a tensile strength, and is used in various skeletal members of the tire such as a tread, a sidewall, a carcass ply, a bead filler and the like. As a countermeasure on the marketing demand for improving the durability of the tire to extend its life, therefore, there is an improvement in the tensile strength of the natural rubber used in the various skeletal members of the tire.

The molecular weight of the natural rubber is inherently very high such as RSS. However, when the viscosity is too high in the preparation of a rubber composition by compounding with a filler in a mixer, the processability is deteriorated and the dispersion of the filler is also deteriorated, so that the natural rubber is actually used after being previously peptized by mastication or the like. As a result, the molecular weight of the natural rubber is lowered by the peptization and the tensile strength inherent to the natural rubber is not developed sufficiently (see JP-A-2005-162810).

Moreover, among the natural rubbers, TSR is low in the viscosity and relatively good in the processability as compared with RSS. However, since TSR is dried at a high temperature in a short time, the molecular chain is broken and the tensile strength is not high enough.

DISCLOSURE OF THE INVENTION

It is, therefore, an object of the invention to solve the above-mentioned problems of the conventional techniques and to improve the tensile strength and wear resistance of a rubber composition by using the natural rubber for the production of the rubber composition while maintaining its high molecular weight. Also, it is another object of the invention to provide a rubber composition having excellent tensile strength and wear resistance as well as a tire using such a rubber composition and having excellent durability and service life.

The inventor has made various studies in order to achieve the above objects and discovered that the workability in the mixing of the rubber composition can be sufficiently ensured while maintaining a high molecular weight inherent to natural rubber by using an oil-extended natural rubber, which is obtained by adding an emulsified extension oil to a natural rubber latex, coagulating and drying them, and the resulting rubber composition has the excellent tensile strength and wear resistance, and as a result the invention has been accomplished.

That is, the oil-extended natural rubber according to the invention is characterized by adding an emulsified extension oil to a natural rubber latex, and further coagulating and drying them.

In a preferable embodiment of the oil-extended natural rubber according to the invention, an amount of the extension oil added is 5-80% by mass based on a rubber component in the natural rubber latex.

In the oil-extended natural rubber according to the invention, it is preferable that a weight average molecular weight as converted to polystyrene of the rubber component is not less than 1,500,000.

In another preferable embodiment of the oil-extended natural rubber according to the invention, an aniline point of the extension oil is 50-100° C.

Also, the method for producing an oil-extended natural rubber according to the invention comprises steps of adding an emulsified extension oil to a natural rubber latex, and further coagulating and drying them.

Moreover, the rubber composition according to the invention is characterized by comprising the above oil-extended natural rubber and a filler.

In a preferable embodiment of the rubber composition according to the invention, a ratio of a natural rubber derived from the oil-extended natural rubber is not less than 10% by mass in a whole rubber component.

The rubber composition according to the invention is preferable to comprise as the filler 20-150 parts by mass of carbon black having a nitrogen adsorption specific surface area of not less than 80 $m^2/g$ or a DBP absorption of not more than 110 mL/100 g based on 100 parts by mass of the rubber component.

The rubber composition according to the invention is also preferable to contain 20-120 parts by mass of silica as the filler based on 100 parts by mass of the rubber component.

Furthermore, the tire according to the invention is characterized by using the above rubber composition in any tire member.

According to the invention, the processability in the mixing of the rubber composition can be sufficiently ensured while maintaining the high molecular weight inherent to natural rubber by using the oil-extended natural rubber, which is obtained by adding the emulsified extension oil to the natural rubber latex, coagulating and drying them. Moreover, there can be provided the rubber composition having the excellent tensile strength and wear resistance as well as the tire using the rubber composition and having an excellent durability and a long service life.

BEST MODE FOR CARRYING OUT THE INVENTION

The invention will be described in detail below. The oil-extended natural rubber according to the invention is characterized by adding the emulsified extension oil to the natural rubber latex, further coagulating and drying them. The rubber composition according to the invention is characterized by comprising the oil-extended natural rubber and the filler, and the tire according to the invention is characterized in that the rubber composition is used in any member of the tire. The oil-extended natural rubber according to the invention, which is obtained by including the extender oil in a stage of the latex, is high in the tensile strength because the high molecular weight inherent to natural rubber is maintained, and is low in the viscosity and good in the processability because it contains the extender oil. Moreover, the oil-extended natural rubber balancing the processability and high tensile strength can be obtained by drying at a moderate condition not lowering the molecular weight. And also, the rubber composition according to the invention using the oil-extended natural rubber is good in the processability during the mixing and has excellent tensile strength and wear resistance, and further it is possible to improve the durability of the tire to extend the service life thereof by using the rubber composition.

The natural rubber latex used in the production of the oil-extended natural rubber of the invention is not particularly limited and can include, for example, a field latex, an ammonia-treated latex, a centrifugally concentrated latex, a deproteinized latex treated with a surfactant or an enzyme, a combination thereof and the like.

Also, the extension oil used in the production of the oil-extended natural rubber of the invention is not particularly limited and one can be properly selected from ones conventionally used as an extension oil for a rubber. The extension oil can be roughly classified into mineral oil-based, vegetable oil-based and synthetic oil-based ones. As the mineral oil-based extension oil are mentioned petroleum-based process oils such as a paraffinic process oil, a naphthenic process oil, an aromatic process oil and the like; a highly polymerized aromatic oil having a high boiling point, a liquid paraffin, a white oil and the like. As the vegetable oil-based extension oil are mentioned a palm oil, a coconut oil, a castor oil and the like. These extension oils may be used alone or in a combination of two or more.

Moreover, the extension oil preferably has an aniline point of 50-100° C., and more preferably 60-95° C. When the aniline point of the extension oil is less than 50° C., the wear resistance and tensile strength of the rubber composition using the oil-extended natural rubber are deteriorated, while when it exceeds 100° C., the compatibility with the natural rubber is deteriorated and the extension oil bleeds (is precipitated) after the oil extension.

In the invention, the extension oil is emulsified and added to the natural rubber latex. A method for emulsifying the extension oil is not particularly limited and the emulsification may be conducted by using a known emulsifying agent. As an example, the oil-extended natural rubber according to the invention can be produced by homogeneously stirring the natural rubber latex added with the emulsified extension oil, then coagulating and drying them with a drying machine such as a hot air drier, a vacuum drier, an air drier, a drum drier or the like. A coagulating agent used for coagulating the natural rubber latex is not particularly limited and includes acids such as formic acid, sulfuric acid and the like, and salts such as sodium chloride and the like. Moreover, the drying of the coagulum is preferably conducted under a moderate condition not lowering the molecular weight of the rubber component, and more preferably conducted so that the weight average molecular weight as converted to polystyrene of the rubber component is not less than 1,500,000.

In the production of the oil-extended natural rubber according to the invention, the amount of the extension oil added is preferable to be within a range of 5-80% by mass based on the rubber component in the natural rubber latex. When the amount of the extension oil added is less than 5% by mass based on the rubber component in the natural rubber latex, it is difficult to sufficiently obtain the oil-extended natural rubber having the good processability, while when the amount of the extension oil added exceeds 80% by mass, the processability is deteriorated due to the adhesion to an equipment or the like in the drying step after the coagulation, and also the low fuel consumption and the wear resistance as the rubber composition may be highly deteriorated.

Moreover, the oil-extended natural rubber according to the invention preferably has a weight average molecular weight as converted to polystyrene of the rubber component of not less than 1,500,000, and more preferably not less than 1,700,000. When the weight average molecular weight as converted to polystyrene of the rubber component in the oil-extended natural rubber is less than 1,500,000, the desired effect of improving the tensile strength may not be obtained sufficiently.

The rubber composition according to the invention is characterized by comprising the above oil-extended natural rubber of the invention and the filler. In the rubber composition according to the invention, the ratio of the natural rubber derived from the oil-extended natural rubber is preferable to be not less than 10% by mass in the whole rubber component of the rubber composition. When the ratio of the natural rubber derived from the oil-extended natural rubber is less than 10% by mass in the whole rubber component, there may not be obtained rubber compositions having desired properties (i.e., excellent tensile strength and wear resistance). The rubber composition of the invention may contain a rubber other than the natural rubber derived from the above oil-extended natural rubber. As such a rubber are mentioned, for example, a normal natural rubber (NR) and a diene-based synthetic rubber. As the diene-based synthetic rubber are mentioned styrene-butadiene copolymer rubber (SBR), polybutadiene rubber (BR), polyisoprene rubber (IR), butyl rubber (IIR), ethylene-propylene rubber, a blend thereof and the like.

The filler used in the rubber composition according to the invention is not particularly limited and may include ones usually used in the rubber industry such as carbon black, silica, alumina, aluminum hydroxide, clay, calcium carbonate and the like. These fillers may be used alone or in a combination of two or more.

When carbon black is compounded as the filler into the rubber composition of the invention, the carbon black is preferable to have a nitrogen adsorption specific surface area ($N_2SA$) of not less than 80 $m^2/g$ or a DBP (di-n-butyl phthalate) adsorption of not more than 110 mL/100 g, and more preferable to have the nitrogen adsorption specific surface area ($N_2SA$) of not less than 100 $m^2/g$ or the DBP adsorption of not more than 90 mL/100 g. Since the above oil-extended natural rubber of the invention is excellent in the processability, even if such a rubber is compounded with a small diameter carbon black having a nitrogen adsorption specific surface area ($N_2SA$) of not less than 80 $m^2/g$ or a low structure carbon black having a DBP adsorption of not more than 110 mL/100 g, which is generally assumed to have a bad processability, the dispersibility of the carbon black is high as compared with the case using the conventional natural rubber and the properties of the rubber composition such as a wear resistance, a low loss factor (low hysteresis loss) and the like can be improved largely. The carbon black is not particularly limited and can be properly selected from ones usually used as a filler for reinforcing rubber. As the carbon black are mentioned, for example, ones of FEF, GPF, SRF, HAF, ISAF and SAF grades. Among them, HAF, ISAF and SAF grade carbon blacks are preferable in view of improving the wear resistance of the rubber composition when it is used in the tread. Moreover, the amount of the carbon black compounded is preferable to be within a range of 20-150 parts by mass based on 100 parts by mass of the rubber component. When the amount of the carbon black compounded is less than 20 parts by mass, a sufficient reinforcing property may not be obtained, while when it exceeds 150 parts by mass, the workability in the mixing may be deteriorated.

Also, when silica is compounded as the filler into the rubber composition of the invention, the amount of the silica compounded is preferable to be within a range of 20-120 parts by mass based on 100 parts by mass of the rubber component. When the amount of the silica compounded is less than 20 parts by mass, a sufficient reinforcing property may not be obtained, while when it exceeds 120 parts by mass, the processability in the mixing may be deteriorated. The silica is not particularly limited, but is preferable to be a precipitated silica, a fumed silica and a colloidal silica.

In the rubber composition of the invention can be compounded additives usually used in the rubber industry such as a vulcanizing agent, a vulcanization accelerator, a process oil, an antioxidant, an anti-scorching agent, zinc white, stearic acid and the like within a scope of not damaging the object of the invention in addition to the above oil-extended natural rubber, the other rubber component and the filler. As these additives can be preferably used commercially available ones. The rubber composition of the invention can be produced by compounding the oil-extended natural rubber with the filler and, if necessary, the properly selected additives and mixing, warming, extruding and so on.

The tire according to the invention is characterized in that the above rubber composition is used in any tire member. As the tire member are preferable casing members and a tread rubber (including a cap rubber and a base rubber) of the tire. In the casing member of the tire are included all rubber members other than the tread rubber. Among them, an inner member of the tire is particularly preferable, and concretely a belt skim stock, a carcass ply skim stock, a squeegee rubber between plies, a cushion rubber between the tread and the belt, a bead filler and the like are preferable. The tire using the above rubber composition has merits that the durability is excellent and the service life is long. Moreover, the tire according to the invention is not particularly limited as far as the above rubber composition is used in any tire member, and can be produced by the usual method. As a gas filled into the tire can be used usual air or air having a regulated partial oxygen pressure but also an inert gas such as nitrogen, argon, helium or the like.

EXAMPLES

The following examples are given in illustration of the invention and are not intended as limitations thereof.

Production Example 1

A natural rubber latex of clone GT-1 is added with water so as to regulate a dry rubber content (DRC) to 25%, and added with a naphthenic oil [aniline point=85° C.] emulsified to 20% by mass so that a mass of the naphthenic oil becomes 37.5 parts based on 100 parts by dry mass of the natural rubber. Then, they are stirred sufficiently to be homogeneous and coagulated by adding formic acid to adjust pH of the latex to 4.7. The thus obtained solid matter is treated with a clapper 5 times and crumbed through a shredder and dried by means of a hot air drier at 103° C. for 450 minutes to obtain an oil-extended natural rubber A. An analysis using a high performance GPC instrument HLC-8020 manufactured by TOSOH reveals that the oil-extended natural rubber A has a weight average molecular weight as converted to polystyrene of a rubber component of 1,872,000.

Production Example 2

A natural rubber B is obtained in the same manner as in Production Example 1 except that the naphthenic oil emulsified to 20% by mass is not added. Moreover, the same analysis as in Production Example 1 reveals that a weight average molecular weight as converted to polystyrene of a rubber component is 1,884,000.

Production Example 3

A natural rubber C is obtained in the same manner as in Production Example 2 except that the drying by the hot air drier is carried out at 120° C. for 180 minutes instead of 103° C. and 450 minutes. Moreover, the same analysis as in Production Example 1 reveals that a weight average molecular weight as converted to polystyrene of a rubber component is 1,279,000.

Production Example 4

A natural rubber D is obtained by masticating the natural rubber B obtained in Production Example 2 in a plastomill made by TOYO SEIKI at 90° C. for 90 seconds. Moreover, the same analysis as in Production Example 1 reveals that a weight average molecular weight as converted to polystyrene of a rubber component is 1,218,000.

Then, a rubber composition having a compounding recipe as shown in Table 1 is prepared, and the tensile strength and wear resistance of the resulting rubber composition are measured and evaluated by the following methods. Moreover, the processability in the mixing of the rubber composition is evaluated wherein a case that all carbon black is incorporated into the rubber composition after the mixing operation and the carbon black does not exist in the form of a powder is ○ and a case that a part of the carbon black exists in the form of the powder and is not incorporated into the rubber composition after the mixing operation is X. The results are shown in Table 1.

(1) Tensile Strength

A tensile test is conducted according to JIS K 6301-1995 to measure a tensile strength (Tb) of a vulcanized rubber obtained by vulcanizing the rubber composition at 145° C. for 33 minutes.

(2) Wear Resistance

The wear resistance is evaluated by measuring a worn amount of a vulcanized rubber obtained by vulcanizing the rubber composition at 145° C. for 33 minutes at a slip ratio of 60% and room temperature by means of a Lambourn abrasion tester, which is shown by an index on the basis that an inverse number of the worn amount of Comparative Example 3 is 100. The larger the index value, the less the worn amount and the better the wear resistance.

TABLE 1

|  | | Example 1 | Comparative Example 1 | Comparative Example 2 | Comparative Example 3 |
|---|---|---|---|---|---|
| Oil-extended natural rubber A | parts by mass | 137.5 | — | — | — |
| Natural rubber B | | — | 100 | — | — |
| Natural rubber C | | — | — | 100 | — |
| Natural rubber D | | — | — | — | 100 |
| Carbon black N339 | | 80 | 80 | 80 | 80 |
| Naphthenic oil | | — | 37.5 | 37.5 | 37.5 |
| Stearic acid | | 2 | 2 | 2 | 2 |
| Antioxidant 6C *1 | | 1 | 1 | 1 | 1 |
| Zinc white | | 3 | 3 | 3 | 3 |
| Vulcanization accelerator DZ *2 | | 0.8 | 0.8 | 0.8 | 0.8 |
| Sulfur | | 1.2 | 1.2 | 1.2 | 1.2 |
| Weight average molecular weight of rubber component | — | 1,872,000 | 1,884,000 | 1,279,000 | 1,218,000 |
| Mixing processability | — | ○ | X | ○ | ○ |
| Tensile strength | MPa | 35.7 | 32.1 | 31.5 | 30.9 |
| Wear resistance | index | 112 | 99 | 101 | 100 |

*1 N-(1,3-dimethylbutyl)-N'-phenyl-p-phenylenediamine.
*2 N,N'-dicyclohexyl-2-benzothiazolyl sulfenamide.

The rubber composition of Example 1 is good in the mixing processability because it uses the oil-extended natural rubber A according to the invention, and also good in the tensile strength and wear resistance. On the other hand, the rubber composition of Comparative Example 1 using the natural rubber B having a high molecular weight is bad in the mixing processability and is inferior to the rubber composition of Example 1 in the tensile strength and wear resistance. Moreover, the rubber composition of Comparative Example 2 using the natural rubber C obtained by drying the natural rubber latex at high temperature and the rubber composition of Comparative Example 3 using the natural rubber D obtained by masticating the natural rubber B are good in the mixing processability but are inferior to the rubber composition of Example 1 in the tensile strength and wear resistance.

The invention claimed is:

1. An oil-extended natural rubber formed by adding an emulsified extension oil to a natural rubber latex, coagulating a mixture of the natural rubber latex and the emulsified extension oil, and drying only a resulting coagulum,
    wherein a weight average molecular weight as converted to polystyrene of a dry rubber component is not less than 1,500,000, and
    wherein an aniline point of the extension oil is 85-100° C.

2. An oil-extended natural rubber according to claim 1, wherein an amount of the extension oil added is 5-80% by mass based on the dry rubber component in the natural rubber latex.

3. A method for producing an oil-extended natural rubber of claim 1, which comprises steps of adding an emulsified extension oil to a natural rubber latex, coagulating a mixture of the natural rubber latex and the emulsified extension oil, and drying only a resulting coagulum.

4. A rubber composition comprising an oil-extended natural rubber as claimed in claim 1 and a filler.

5. A rubber composition according to claim 4, wherein a ratio of a natural rubber derived from the oil-extended natural rubber is not less than 10% by mass in a whole rubber component.

6. A rubber composition according to claim 4, which comprises as the filler 20-150 parts by mass of carbon black having a nitrogen adsorption specific surface area of not less than 80 m$^2$/g and a DBP adsorption number of not more than 110 mL/100g based on 100 parts by mass of a rubber component.

7. A rubber composition according to claim 4, which comprises as the filler 20-120 parts by mass of silica based on 100 parts by mass of a rubber component.

8. A tire comprising a rubber composition as claimed in claim 4 in any tire member.

* * * * *